(12) United States Patent
Ayvaci et al.

(10) Patent No.: US 9,805,274 B2
(45) Date of Patent: Oct. 31, 2017

(54) PARTIALLY OCCLUDED OBJECT DETECTION USING CONTEXT AND DEPTH ORDERING

(71) Applicant: HONDA MOTOR CO., LTD., Minato-ku, Tokyo (JP)

(72) Inventors: Alper Ayvaci, Santa Clara, CA (US); Bernd Heisele, Mountain View, CA (US); Jingjing Zheng, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 15/015,033

(22) Filed: Feb. 3, 2016

(65) Prior Publication Data

US 2017/0220874 A1  Aug. 3, 2017

(51) Int. Cl.
*G06K 9/00* (2006.01)
*G06K 9/46* (2006.01)
(Continued)

(52) U.S. Cl.
CPC ..... *G06K 9/00791* (2013.01); *G06K 9/00362* (2013.01); *G06K 9/4604* (2013.01);
(Continued)

(58) Field of Classification Search
CPC .... G06K 9/00791; G06K 9/4604; G06K 9/52; G06K 9/6201; G06K 9/00362;
(Continued)

(56) References Cited

U.S. PATENT DOCUMENTS

2004/0258279 A1* 12/2004 Hirvonen ........... G06K 9/00201
382/104
2005/0243323 A1  11/2005 Hsu et al.
(Continued)

FOREIGN PATENT DOCUMENTS

| CN | 20141751953 A | 3/2015 |
|---|---|---|
| CN | 2015132567 A | 5/2015 |
| CN | 2015174534 A | 6/2015 |

OTHER PUBLICATIONS

Fukui, H., et. al. "Pedestrian Detection Based on Deep Convolutional Neural Network with Ensemble Inference Network," Intelligent Vehicles Symposium, Jun. 28-Jul. 15, 2015.
Oliveira, L., et. al., "Semantic Fusion of Laser and Vision in Pedestrian Detection," Pattern Recognition, vol. 43, pp. 3648-3659, 2010.
(Continued)

*Primary Examiner* — Amandeep Saini
(74) *Attorney, Agent, or Firm* — Arent Fox LLP (57) ABSTRACT

A system and method for verifying detection of partially occluded objects (e.g., pedestrians) in the vicinity of a vehicle. An image input device captures an image and/or video of surroundings. An object detector detects partially occluded pedestrians and other objects in received image information. The detection of a partially occluded pedestrian is verified when a detection window of the partially occluded pedestrian overlaps with a detection window of an occluding object, and the occluding object window is closer to the image input device than the partially occluded object window. Optionally, a range-finding sensor, such as a LIDAR device, determines a range to objects located in the direction of the partially occluded object. The detection of the partially occluded object is verified when the range of one of the other objects located in the direction of the partially occluded object is less than that of the partially occluded object.

20 Claims, 4 Drawing Sheets

(51) Int. Cl.
*G06K 9/52* (2006.01)
*G06K 9/62* (2006.01)
*G06T 7/00* (2017.01)
*G06T 7/60* (2017.01)

(52) U.S. Cl.
CPC ............. *G06K 9/52* (2013.01); *G06K 9/6201* (2013.01); *G06T 7/0081* (2013.01); *G06T 7/0085* (2013.01); *G06T 7/60* (2013.01); *G06K 2009/4666* (2013.01); *G06T 2207/20112* (2013.01); *G06T 2207/30196* (2013.01); *G06T 2207/30252* (2013.01)

(58) Field of Classification Search
CPC .......... G06K 2009/4666; G06T 7/0081; G06T 7/0085; G06T 7/60; G06T 2207/20112; G06T 2207/30196; G06T 2207/30252
USPC ........................................................ 382/104
See application file for complete search history.

(56) References Cited

U.S. PATENT DOCUMENTS

| | | |
|---|---|---|
| 2008/0284864 A1 | 11/2008 | Kotake et al. |
| 2009/0041297 A1 | 2/2009 | Zhang et al. |
| 2009/0110239 A1 | 4/2009 | Chen et al. |
| 2011/0175809 A1 | 7/2011 | Markovic et al. |
| 2013/0051613 A1 | 2/2013 | Bobbitt et al. |
| 2013/0058535 A1 | 3/2013 | Othmezouri et al. |
| 2013/0163879 A1 | 6/2013 | Katz et al. |
| 2013/0201329 A1 | 8/2013 | Thornton et al. |
| 2014/0347475 A1 | 11/2014 | Divakaran et al. |

OTHER PUBLICATIONS

Szarvas, M., et. al., "Real-time Pedestrian Detection Using LIDAR and Convolutional Neural Networks," Intelligent Vehicles Symposium, Jun. 13-15, 2006.

* cited by examiner

PARTIALLY OCCLUDED OBJECT DETECTION USING CONTEXT AND DEPTH ORDERING

TECHNICAL FIELD

This disclosure relates generally to driver assistance systems and, more particularly, to a system for detection of a partially occluded object in a driving scene.

BACKGROUND

Driver assistance systems are systems that generally help a driver in a vehicle during the driving process. Some examples of driver assistance systems may include, but are not limited to in-vehicle navigation systems, Adaptive Cruise Control (ACC) systems, lane departure warning systems, collision avoidance systems, automatic parking systems, and blind spot detection systems. Driver assistance systems may be used to increase vehicle and road safety.

Modern vehicle systems, such as, but not limited to, driver assistance systems, rely on computer vision-based pedestrian detection. In vision-based detection systems, sensors may be equipped in vehicles to collect data from surroundings, and decision may be made based on sensory data. Typical sensors for detecting pedestrians may be cameras that capture images of surroundings. Pedestrians may be partially occluded by objects, such as cars, trees, shrubbery, signs, among others, in a driving scene. Accordingly, vehicle systems may use computer vision techniques, for example, part-based models trained on upper-body pedestrian images, to detect partially occluded pedestrians. However, an image-based detector trained on images of parts of an object may have lower precision than that of an image-based detector trained on images of a whole object. Thus, there is a need in the art for a partially occluded object detection system that also verifies whether a detection of a partially occluded object is accurate, so as to reduce false positive results.

SUMMARY

According to one aspect, the disclosure provides a computer-implemented method and system for verifying detection of a first object partially occluded by a second object relative to a vehicle. An image input device on a vehicle for which verification is being sought captures an image and/or video of surroundings. An object detector detects a first object, such as a partially occluded object (e.g., a pedestrian), which may include use of a trained part-based model (e.g., a set of upper-body images of pedestrians), and detects a second object or objects (e.g., a vehicle), including any occluding objects, in an image and/or video information that has been received. In one verification procedure, the detection of a partially occluded object is verified when a detection window of the partially occluded object and a detection window of one of the other objects overlap, or are in close proximity, and the distance of the detection window of the partially occluded object to the image input device is more than the distance of the detection window of one of the other occluding objects to the image input device.

According to another verification procedure, a range-finding sensor on the vehicle determines a range to other vehicles and/or other occluding objects located in the direction of the partially occluded pedestrian detected by the object detector. The detection of the partially occluded pedestrian is verified when the range of one of the vehicles or other occluding objects located in the direction of the partially occluded object (e.g., pedestrian) is less than the distance of the detection window of the partially occluded object relative to the image input device.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale, and certain figures may be shown in exaggerated or generalized form in the interest of clarity and conciseness. The disclosure itself, however, as well as a preferred mode of use, further features and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus," as used herein, refers to an interconnected architecture that is operatively connected to other computer components inside a computer or between computers. The bus is able to transfer data among the computer components. The bus may be a memory bus, a memory controller, a peripheral bus, an external bus, a crossbar switch, and/or a local bus, among others. The bus may also be a vehicle bus that interconnects components inside a vehicle using protocols, such as Media Oriented Systems Transport (MOST), Controller Area network (CAN), Local Interconnect Network (LIN), among others.

"Computer communication," as used herein, refers to a communication among two or more computing devices (e.g., computer, personal digital assistant, cellular telephone, network device) and may include, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein may include, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database" or "database repository" as used herein refers to a table, a set of tables, a set of data stores and/or methods for accessing and/or manipulating those data stores. Some databases may be incorporated with a disk as defined above.

A "memory," as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operatively connected," is one in which signals, physical communications, and/or logical communications may be sent and/or received. An operable connection may include a wireless interface, a physical interface, a data interface, and/or an electrical interface.

A "processor," as used herein, processes signals and performs general computing and arithmetic functions. Signals processed by the processor may include digital signals, data signals, computer instructions, processor instructions, messages, a bit, a bit stream, or other features that may be received, transmitted and/or detected. Generally, the processor may include a variety of various processors, including multiple single and multi-core processors and co-processors and other multiple single and multi-core processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, sport utility vehicles (SUVs), motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is operated entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with predetermined paths, or free-moving vehicles.

I. SYSTEM OVERVIEW

Figure 1:
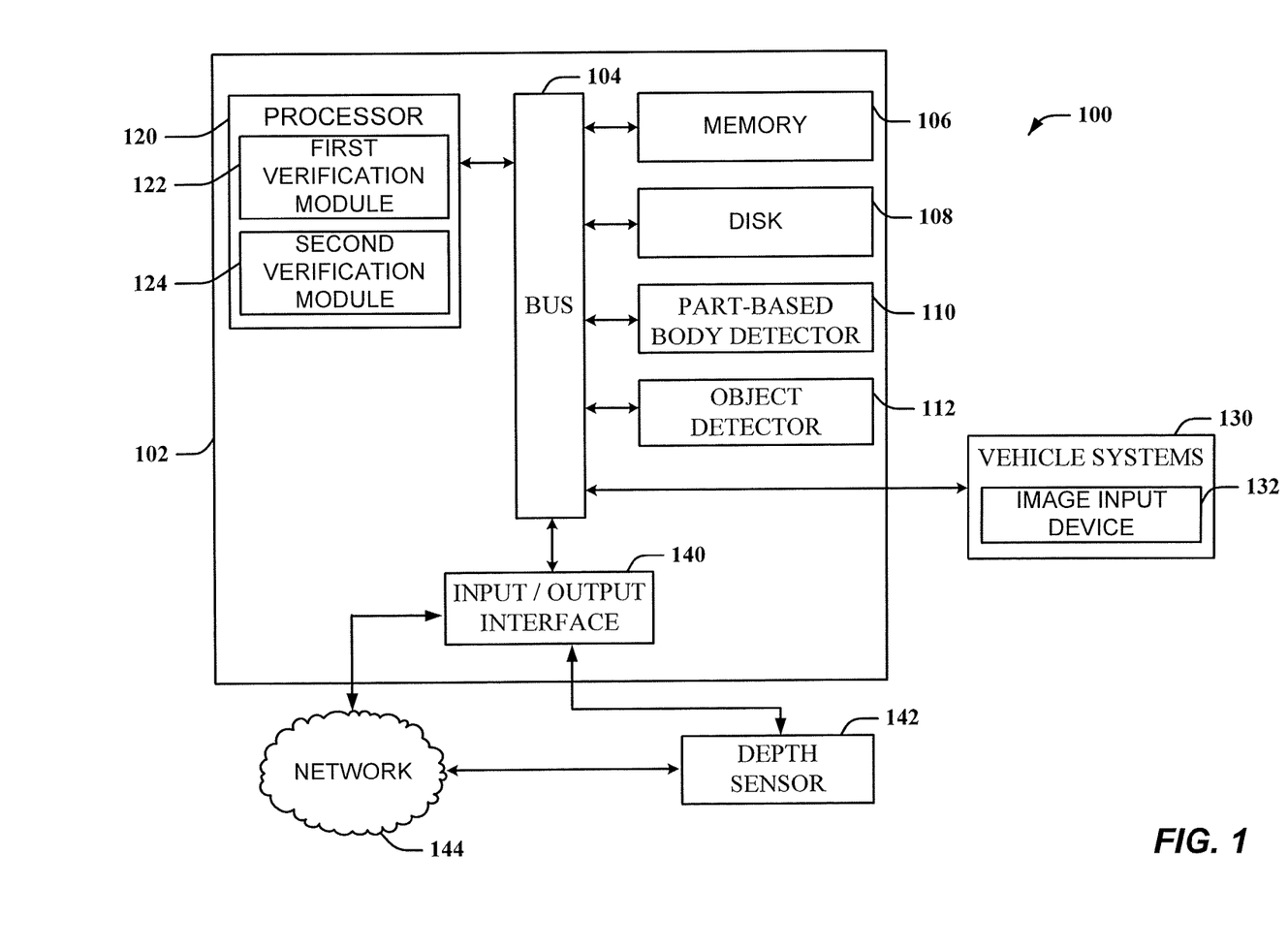
FIG. 1 is a schematic diagram of an example operating environment for implementing systems and methods for partially occluded object detection in accordance with aspects of the present disclosure.

Generally, among other things, the systems and methods disclosed herein are directed to detecting partially occluded objects (e.g., pedestrians, motorcyclists, bicyclists, and/or animals) in the vicinity of a vehicle and verifying whether the detections of the partially occluded objects are accurate, in order to reduce false positive detection results. Referring now to the drawings, wherein the showings are for purposes of illustrating one or more example aspects and not for purposes of limiting the same, FIG. 1 is a schematic diagram of an operating environment 100 for implementing systems and methods for partially occluded object detection. The components of environment 100, as well as the components of other systems, hardware architectures, and software architectures discussed herein, may be combined, omitted, or organized into different architectures for various aspects. Further, the components of the operating environment 100 may be implemented with or associated with a vehicle (not shown) for partially occluded pedestrian detection by, for example, an Advanced Driver Assistance System (ADAS).

FIG. 1 shows an example environment 100 usable in accordance with aspects of the present disclosure. The environment 100 includes a vehicle computing device 102 (VCD) with provisions for processing, communicating and interacting with various components of a vehicle and other components of the environment 100. In one aspect, the VCD 102 may be integrated as part of a telematics unit, a head unit, a navigation unit, an infotainment unit, an electronic control unit, among others (not shown). In other aspects, the components and functions of the VCD 102 may be implemented at least partially remotely from a vehicle, for example, in conjunction with use of a portable device (not shown) or another device connected via a network (e.g., a network 144).

Generally, the VCD 102 includes a processor 120, a memory 106, a disk 108, a part-based body detector 110, an object detector 112, and an input/output (I/O) interface 140, which are each operatively connected for computer communication via a bus 104 and/or other wired and/or wireless technologies. The I/O interface 140 provides software and hardware to facilitate data input and output among the components of the VCD 102 and other components, networks, and data sources, which will be described herein. Additionally, the processor 120 includes a first verification module 122 and a second verification module 124 suitable for providing verification of partially occluded object detection facilitated by the components of the environment 100.

The VCD 102 is also operatively connected for computer communication (e.g., via the bus 104 and/or the I/O interface 140) to one or more vehicle systems 130. Vehicle systems may include, but are not limited to, any automatic or manual systems that may be used to enhance the vehicle systems, driving, and/or safety. For example, the vehicle systems 130 may include, but are not limited to, ADAS that may rely on computer vision based pedestrian detection. The vehicle systems 130 may include and/or may be operatively coupled for computer communication to various vehicle sensors (e.g., image input device 132), which provide and/or sense information associated with the vehicle, the vehicle environment, and/or the vehicle systems 130.

An object detector, which may include the image input device 132 may receive an input image. The image input device 132 may be any type of image sensor and/or device to capture an image and/or a video. In some aspects, the image input device 132 is part of a vehicle system 130 or a computer vision system (not shown). In other aspects, the image input device 132 is a remote device accessed, for example, via the network 144. The network 144 may include, for example, a data network, the Internet, a wide area network or a local area network. The network 144 may serve as a communication medium to various remote devices (e.g., databases, web servers, remote servers, application servers, intermediary servers, client machines, other portable devices).

The VCD 102 may also be operatively coupled for communication to a depth sensor 142 and, as mentioned above, the network 144. The connection from the I/O interface 140 to the depth sensor 142 and the network 144 may be facilitated in various ways. For example, through a network coupling (e.g., wired and/or wireless), a cellular data network from a portable device (not shown), a vehicle to vehicle ad-hoc network (not shown), an in-vehicle network (not shown), among others, or any combination thereof.

The depth sensor 142 may detect obstacles around a vehicle and provide range measurements to those obstacles. The depth sensor 142 may be any type of range-finding sensor and/or device, such as, but not limited to, a light detection and ranging (LIDAR) sensor, a stereo camera, and/or a radio detection and ranging (RADAR) sensor. For example, for one type of LIDAR sensor usable in accordance with aspects of the present disclosure, reflections from an object are returned as a scan point as part of a point cloud. A separate scan point may be provided, for example, for every $$\frac{1°}{2}$$

across the field-of-view of the sensor. In an aspect, a vehicle may have multiple depth sensors 142 to provide up to a 360° field-of-view around the vehicle. These multiple depth sensors 142 may include side looking sensors, rearward looking sensors, and forward looking sensors. Each of the depth sensors 142 detect objects in its field-of-view independently of the other depth sensors 142. Using the scan point returns from the depth sensor or sensors 142, the point cloud is generated to detect objects in proximity of the vehicle. For a vehicle with multiple depth sensors 142, multiple point clouds may be returned, and for overlapping sensor field-of-views, some depth sensors 142 may be detecting the same object. In this case, it is necessary to combine the point clouds of the depth sensors 142 so that the same object detected by the depth sensors 142 is processed as a single object. In some aspects, the depth sensor(s) 142 may include a remote device accessed, for example, via the network 144. In other aspects, the depth sensor(s) 142 may be part of vehicle system 130.

Figure 2:
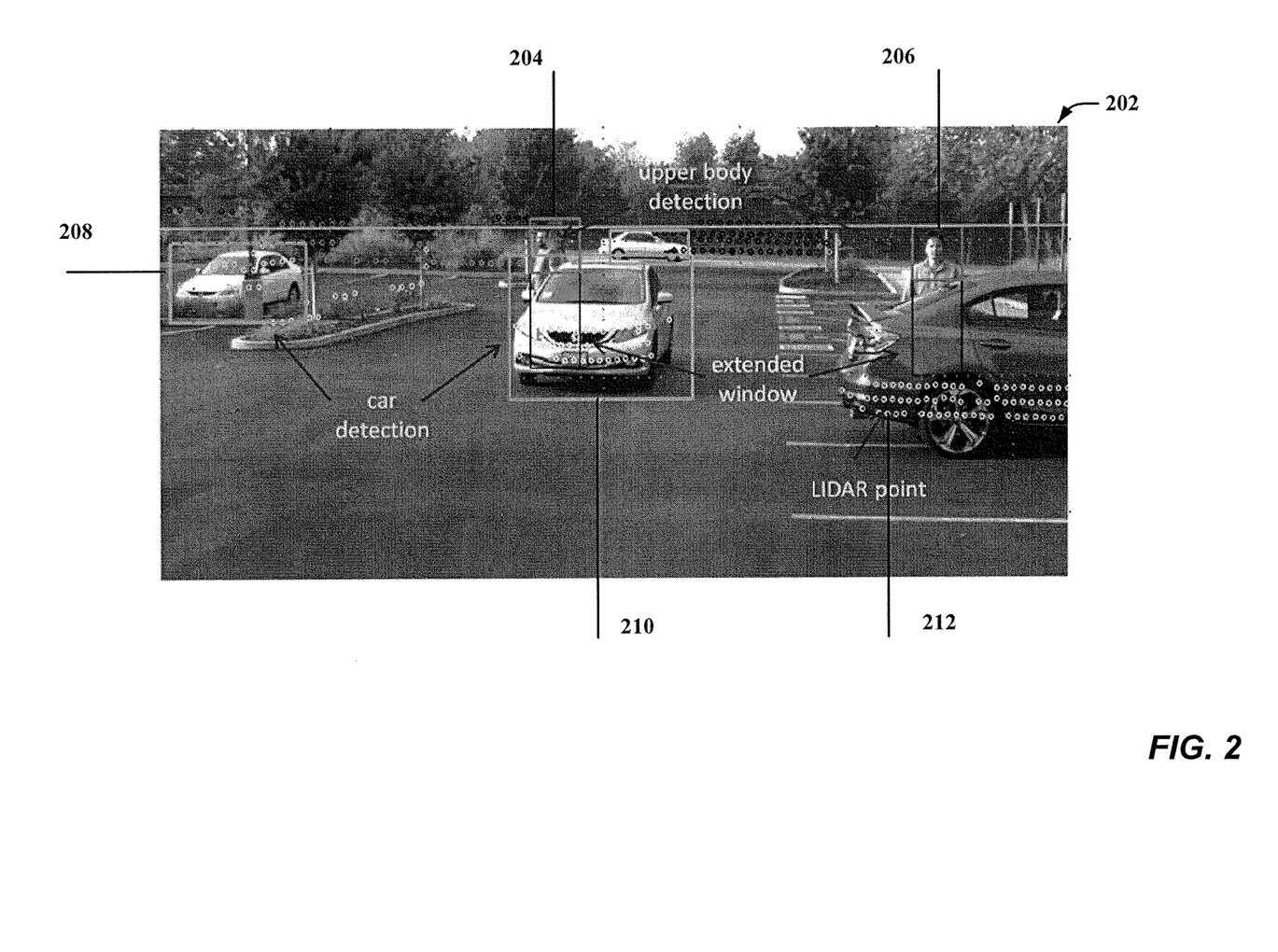
FIG. 2 is an example image of various features relating to partially occluded object detection, in accordance with aspects of the present disclosure.

The system shown in FIG. 1 will now be described according to an example implementation in accordance with aspects of the present disclosure. As mentioned above, the system of this example implementation includes an image input device 132. The image input device receives an input image. For example, in FIG. 1, the image input device 132 receives an input image. The input image may include, for example, a driving scene image that includes one or more pedestrians or other objects for object detection. FIG. 2, which will be described in more detail herein, illustrates an example input image 202.

As shown in FIG. 1, the part-based body detector 110 may determine one or more body part detection windows of the input image. As will be discussed herein, the body part detection window may include a "sliding" window (e.g., a box shaped window imposed on the image, which may have variable length and/or width) used for detection of partially occluded objects (e.g., partially occluded pedestrians) based on a trained model (e.g., set of upper-body images of pedestrians). Aspects of the detection of partially occluded objects based on a trained model are described, for example, in the Applicant's co-pending U.S. patent application Ser. No. 14/641,506, which is incorporated herein by this reference in its entirety. The trained model (not shown) may be stored in, for example, the memory 106 and/or another memory accessible in the network 144. The trained model may use data (e.g., templates) to learn the relationships among observed image data (e.g., the input image) and estimate aspects of the image data and the image scene to make new inferences about the image scene from the image data. Moreover, the object detector 112 may determine one or more object detection windows (e.g., vehicle detection and/or other occluding object windows) of the input image. Although illustrated as separate components in FIG. 1, it is to be appreciated that the part-based body detector 110 and the object detector 112 may be combined into a single component.

Referring again to FIG. 1, the system also includes a processor operatively connected for communication with the image input device, the depth sensor, the part-based body detector, and the object detector. As mentioned above, the processor 104 may be operatively coupled for computer communication (e.g., via the I/O interface 140 and/or the network 144) to the image input device 132, the depth sensor 142, the part-based body detector 110, and the object detector 112. Further, the processor 104 may include and/or carry out aspects of operation of the first verification module 122 and the second verification module 124, which may be used, for example, to verify whether or not a detection of a partially occluded pedestrian by the part-based body detector 110 is accurate. As will be discussed herein, the first verification module 122 may compare relative distances of a partially occluded pedestrian detected by the part-based body detector 110 and a vehicle or other object detected by the object detector 112 based on the image information received from the image input device 132. Alternatively, or additionally, the second verification module 124 may compare: 1) the distance to a partially occluded pedestrian detected by the part-based body detector 110 based on information in the first verification module 122; and 2) the distance to a vehicle or other object as detected by the depth sensor 142.

II. VERIFICATION METHODS

Figure 3:
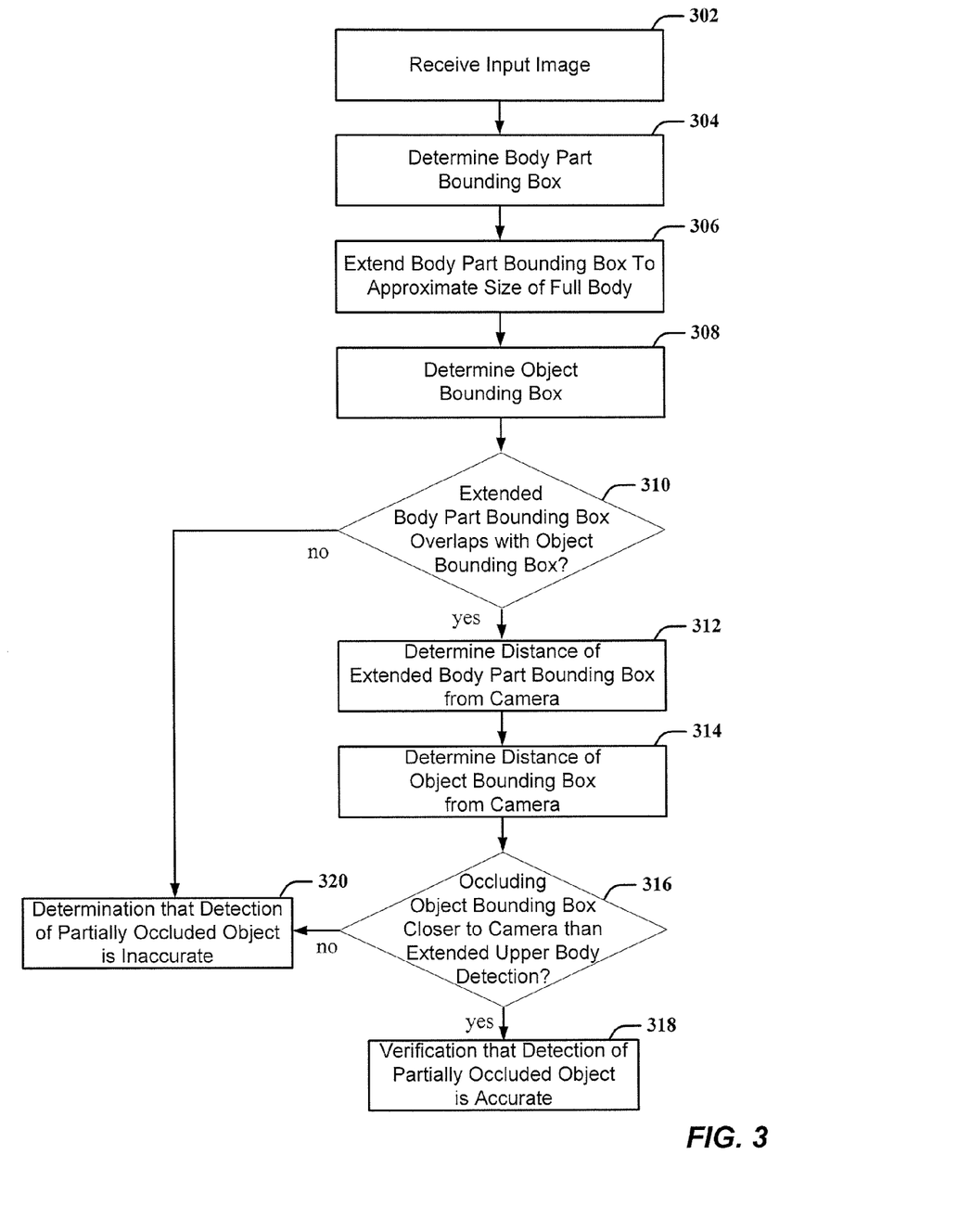
FIG. 3 is an example process flow diagram of a method for verifying detection of partially occluded objects using ground plane estimation, in accordance with aspects of the present disclosure.

Referring now to FIG. 3, a method for verifying detection of partially occluded and other objects according an example aspect of the present disclosure will be discussed. FIG. 3 will be described with reference to the components of FIG. 1 and FIG. 2. Additionally, the methods will be described with reference to algorithms, which may also be implemented with the system shown in FIG. 1 and described in conjunction therewith, and other systems and methods. At block 302, the method includes receiving an input image from the image input device 132 (FIG. 1). The input image may be a grayscale image expressed as I: $\Lambda \subset \mathbb{Z} \to [0,255]$, where $\Lambda$ is a lattice. The input image may include, for example, part of a driving scene captured by the image input device 132 (FIG. 1). Further, the input image may include one or more partially occluded objects. For example, input image 202 as shown in FIG. 2 may include two pedestrians (see boxes 204, 206) each partially occluded by a vehicle.

At block 304, the method includes detecting and identifying a partially occluded object (e.g., a partially occluded pedestrian) in the input image. In an aspect, the part-based body detector 110 (e.g., in conjunction with processor 120 and/or memory 106 as shown in FIG. 1) may determine a set of body part detection windows (e.g., upper-body detection windows) on the input image I based on a training set of body part images (e.g., upper-body images of pedestrians). The part-based body detector 110 (FIG. 1) may include, for example, a sliding window detector. The set of upper-body detection windows identified by the part-based body detector 110 (FIG. 1) may be expressed as $\{u_i\}_{i=1}^{U}$. Further, each upper-body detection window $u_i = [u_i^x, u_i^y, u_i^w, u_i^h]$ may be represented as an upper-body bounding box on the input image, where the position of the top-left corner of the upper-body bounding box is expressed as $(u_i^x, u_i^y)$, and the width and height of the upper-body bounding box is expressed as $(u_i^w, u_i^h)$. For example, the part-based body detector 110 (FIG. 1) may detect two upper-body detection windows 204, 206 on the input image 202 as shown in FIG. 2.

At block 306, the method includes extending each upper-body bounding box to approximately the full body size of a pedestrian. In an aspect, the part-based body detector 110 (e.g., in conjunction with processor 120 and/or memory 106 as shown in FIG. 1) may extend each upper-bounding box $u_i$ by a factor of $\sigma$ to $\tilde{u}_i$, where $\tilde{u}_i = [u_i^x, u_i^y, u_i^w, \sigma u_i^h]$ and $\sigma$ is set based on a training set of upper-body images of pedestrians. For example, if images each including one-third of the human body are used to train the part-based body detector 110, then $\sigma$ may be set to three so that each of the upper-bounding boxes extends from one-third of the size of the body of a pedestrian to approximately the full size of the pedestrian. For example, upper-body bounding boxes 204, 206 (FIG. 2) may be extended to approximate size of full bodies as shown in FIG. 2. Accordingly, once extended, the mid-point of the bottom of an upper-body bounding box represents approximately the location where the pedestrian contacts the ground plane.

At block 308, the method includes detecting an object (e.g., occluding and/or non-occluding vehicles or other objects) on the input image. In an aspect, the object detector 112 (e.g., in conjunction with processor 120 and/or memory 106 as shown in FIG. 1) may determine a set of object detection windows (e.g., vehicle detection windows) on the input image I. The set of vehicle detection windows identified by the object detector 112 (FIG. 1) may be expressed as $\{c_j\}_{j=1}^{c}$. Further, each vehicle detection window may be represented as a vehicle bounding box on the input image. For example, the object detector 112 may detect two vehicle detection windows 208, 210 on the input image 202 as shown in FIG. 2. The mid-point of the bottom of a vehicle bounding box represents the location where the vehicle contacts the ground plane.

At block 310, the method includes determining whether or not an extended upper-body bounding box and a vehicle bounding box overlap with each other on the input image. In an aspect, the first verification module 122 (e.g., in conjunction with processor 120 and/or memory 106 as shown in FIG. 1) may determine whether or not there exists a vehicle bounding box $c_j$ such that an extended upper-body bounding box $\tilde{u}_i$ and the vehicle bounding box $c_j$ overlap or are in close proximity. For example, the first verification module 122 (FIG. 1) may determine that the upper-body bounding box 204 and the vehicle bounding box 210 overlap as shown in FIG. 2. In an aspect, if the first verification module 122 (FIG. 1) determines that an extended upper-body bounding box overlaps with a vehicle bounding box, the method proceeds to block 312. Otherwise, the first verification module 122 determines that the detection of the partially occluded pedestrian by the part-based body detector 110 is not accurate, and the method terminates at block 320.

At block 312, the method includes determining the distance of the upper-body bounding box from the image input device. In an aspect, the first verification module 122 (e.g., in conjunction with processor 120 and/or memory 106 as shown in FIG. 1) may determine the distance of the upper-bounding box from the image input device 132 (FIG. 1). In an aspect, the location of the image input device 132 (FIG. 1) may be given by $[0, 0, 0]^T$, and the intrinsic parameters of the image input device 132 (FIG. 1) may be given by:

$$K = \begin{bmatrix} f_x & 0 & o_x \\ 0 & f_y & o_y \end{bmatrix} \quad (1)$$

where $f_x$ and $f_y$ are focal lengths and $o_x$ and $o_y$ are principal point offsets of the image input device. Moreover, the basis of the ground plane G may be estimated and expressed as $g_0 \in \mathbb{R}$ and $g_1 \in \mathbb{R}$. Here, a point on the ground plane G may follow the constraint $n_x X + n_y Y + n_z Z + b = 0$, where the normal of the ground plane G is given by $[n_x, n_y, n_z] = g_0 \times g_1$. Accordingly, the three-dimensional (3-D) coordinates of a pixel $(p, q) \in \Lambda$ on the ground plane G may be calculated according to:

$$\phi(p, q) = \left[ \frac{(p - o_x)}{f_x} Z_{pq}, \frac{(q - o_y)}{f_y} Z_{pq}, Z_{pq} \right] \quad (2)$$

where $$Z_{pq} = \frac{-b}{n_x \frac{(p - o_x)}{f_x} + n_y \frac{(p - o_y)}{f_y} + n_z}. \quad (3)$$

For a detected object, it may be assumed that the mid-point of the bottom of a detection window of the object is the point where the detected object contacts the ground plane G. For example, given a detection window $d = [x, y, w, h]$, the location of where the object contacts the ground plane G is given by $$\left( x + \frac{w}{2}, y + h \right).$$

In this example, the 3-D coordinates of the point where the detected object contacts the ground plane G is given by $$\phi\left( x + \frac{w}{2}, y + h \right),$$

by according to Equations (2) and (3) above. For simplicity, the point where the detected object contacts the ground plane G may alternatively be expressed as φ(d). Based on the location of where the partially occluded object (e.g., partially occluded pedestrian) contacts the ground plane G, the first verification module 122 (FIG. 1) may determine the distance of the partially occluded object from the image input device 132 (FIG. 1). In an aspect, the first verification module 122 (FIG. 1) may determine the distance of the partially occluded object from the image input device 142 (FIG. 1) by calculating a norm of a 3-D vector representing the position of the location where the partially occluded object contacts the ground plane G in relation to the location of the image input device 132 (FIG. 1). For example, the first verification module 122 (FIG. 1) may determine the distance of the extended upper-body bounding box $\tilde{u}_i$ from the image input device 132 (FIG. 1) by calculating the value of $\|\phi(\tilde{u}_i)\|$, where $\phi(\tilde{u}_i)$ is given by Equations (2) and (3) above, and where $\tilde{u}_i = [u_i^x, u_i^y, u_i^w, \sigma u_i^h]$.

Referring again to the method of FIG. 3, at block 314, the method includes determining the distance of a vehicle bounding box from an image input device. In an aspect, the first verification module 122 (e.g., in conjunction with processor 120 and/or memory 106 as shown in FIG. 1) may determine the distance of the vehicle bounding box $c_j$ from the image input device 142 (FIG. 1). As described above with respect to block 312, the first verification module 122 (FIG. 1) may determine the distance of the vehicle bounding box $c_j$ from the image input device 142 (FIG. 1) by calculating the value of $\|\phi(c_j)\|$.

At block 316, the method includes determining whether or not a vehicle bounding box is closer to an image input device than an extended upper-body bounding box. In an aspect, the first verification module 122 (e.g., in conjunction with processor 120 and/or memory 106 as shown in FIG. 1) may determine that the vehicle bounding box $c_j$ is closer to the input image device 132 (FIG. 1) than the upper-body bounding box $\tilde{u}_i$ when the following condition is satisfied:

$$\|\phi(\tilde{u}_i)\| > \|\phi(c_j)\|, \quad (4)$$

where $\phi(\tilde{u}_i)$ and $\phi(c_j)$ may be calculated according to Equations (2) and (3). If the first verification module 122 (FIG. 1) determines that the vehicle bounding box $c_j$ is closer than the upper-body bounding box $\tilde{u}_i$ to the image input device 142 (FIG. 1), then the first verification module 122 (FIG. 1) verifies that the detection of the partially occluded pedestrian by the part-based body detector 110 (FIG. 1) is accurate at block 318. Otherwise, the first verification module 122 (FIG. 1) determines that the detection of the partially occluded pedestrian by the part-based body detector 110 (FIG. 1) is not accurate at block 320.

Figure 4:
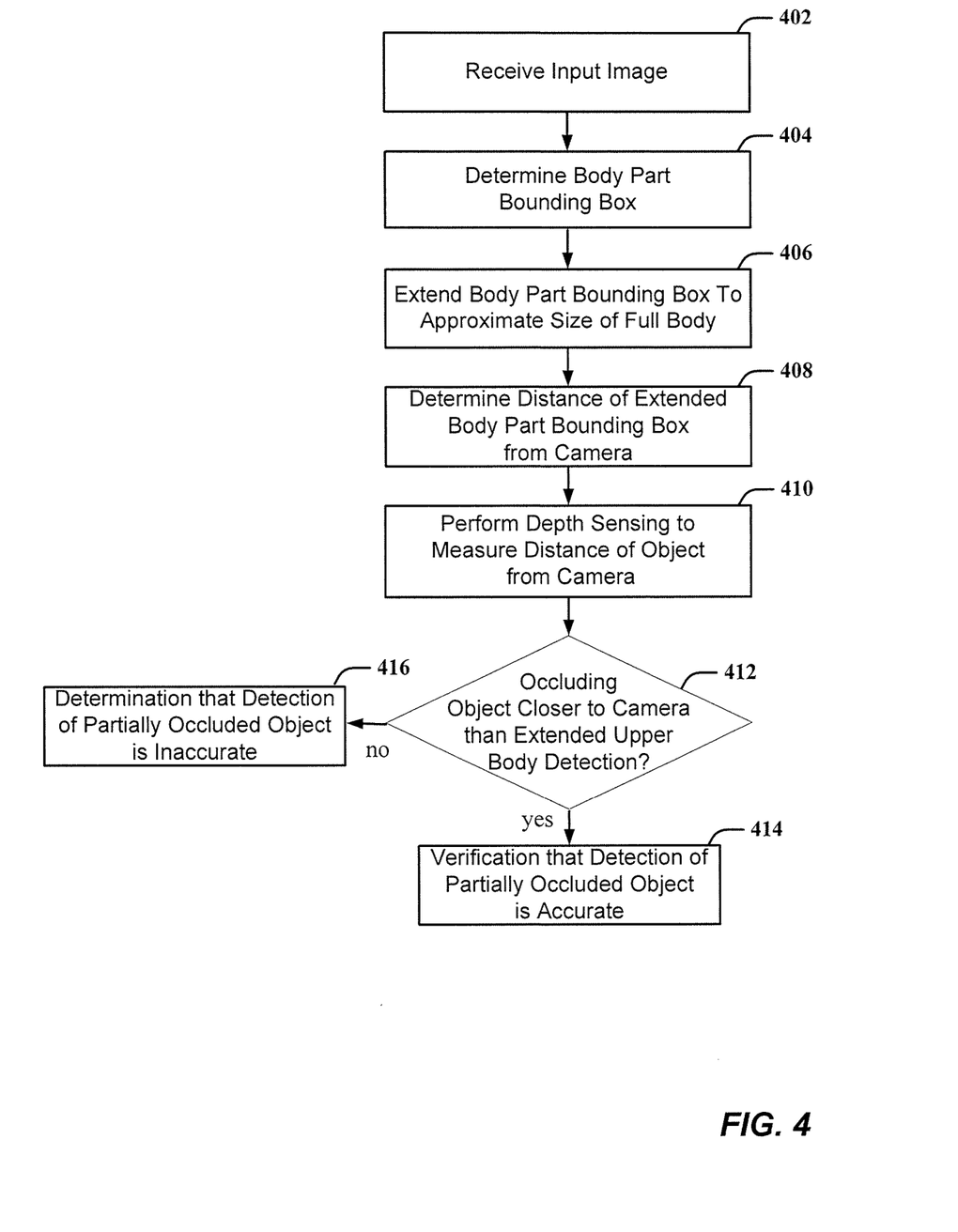
FIG. 4 is an example process flow diagram of a method for verifying detection of partially occluded objects using depth sensing in accordance with aspects of the present disclosure.

Referring now to FIG. 4, a method for verifying the detection of partially occluded objects, in addition to (or as an alternative to) the method of FIG. 3, will be discussed. For example, the method of FIG. 4 may be used as an additional verification procedure performed before or after the method of FIG. 3. The method of FIG. 4 may also be used as an alternative to the method of FIG. 3 when, for example, the object detector 112 (FIG. 1) is unable to identify a vehicle detection window because the input image includes a truncated image of the vehicle and/or the object detector 112 (FIG. 1) is not trained to detect that class of objects (e.g., vehicles). FIG. 4 will be described with reference to the components of FIG. 1 and FIG. 2. Additionally, the methods will be described with reference to algorithms, which may also be implemented with the system described above with respect to FIG. 1, and other systems and methods.

Blocks 402, 404, and 406 of FIG. 4 correspond, respectively, to blocks 302, 304, and 306 described above with regard to FIG. 3. In an aspect, blocks 402, 404, and 406 may be performed by the first verification module 122 (e.g., in conjunction with processor 120 and/or memory 106 as shown in FIG. 1) and/or by the second verification module 124 (e.g., in conjunction with processor 120 and/or memory 106 as shown in FIG. 1).

At block 408, the method of FIG. 4 further includes determining a distance of an extended body part bounding box from an input image device. In an aspect, the second verification module 124 (e.g., in conjunction with processor 120 and/or memory 106 as shown in FIG. 1) may determine the distance of extended upper-body bounding box $\tilde{u}_i$ from the image input device 132 (FIG. 1). The distance of the extended upper-body bounding box $\tilde{u}_i$ from the image input device 132 (FIG. 1) may be given by $\|\phi(\tilde{u}_i)\|$, where $\phi(\tilde{u}_i)$ is calculated by the second verification module 124 (FIG. 1) according to Equations (2) and (3) above.

At block 410, the method includes performing depth sensing to measure a distance of an occluding object from an image input device. In an aspect, the depth sensor 142 (e.g., in conjunction with processor 120, and/or memory 106 as shown in FIG. 1) may perform depth sensing to measure the distance of an occluding object (e.g., vehicle) from image input device 132 (FIG. 1). The depth sensor 142 (FIG. 1) may be or include any of, but is not limited to, a LIDAR sensor, stereo camera, and/or RADAR sensor that produces a point cloud of a scene. In an aspect, the depth sensor 142 (FIG. 1) may perform depth sensing at the same time, or at approximately the same time, that the image input device 132 (FIG. 1) captures the input image I. During depth sensing, e.g., via LIDARs, reflections from each object in a scene are returned as a scan point as part of a point cloud, where a separate scan point is provided, for example, for every ½° across the field-of-view of the depth sensor. The depth sensor may then calculate a set of depth measurements for each object in the scene based on the returned point cloud. In an aspect, the set of depth measurements calculated by the depth sensor 142 may be expressed as $\{s_j\}_{j=i}^s$, where $s_j \in \mathbb{R}^3$.

In an aspect, the second verification module 124 (e.g., in conjunction with depth sensor 142, processor 120, and/or memory 106 as shown in FIG. 1) may select a subset of the set of depth measurements S measured by the depth sensor 142 in the direction of an extended body part bounding box. In an aspect, the second verification module 124 may select a subset of the set of depth measurements S measured in the direction of extended upper-body bounding box $\tilde{u}_i$. For example, the second verification module 124 may select the set of depth measurements corresponding to LIDAR point cloud 212 reflected by the vehicle near extended upper-body bounding box 206 as shown in FIG. 2. The selected subset $S_{u_i} \subset S$ may be expressed as:

$$S_{u_i} = \{s_j | s_j \in S \text{ and } \alpha(\tilde{u}_i^L, g_0) \leq \alpha(\text{proj}_G(s_j), g_0) \leq \alpha(\tilde{u}_i^R, g_0)\} \quad (5)$$

where α represents the angle between the three-dimensional coordinates of the bottom-left $\tilde{u}_i^L = 0(\tilde{u}_i^x, \tilde{u}_i^y + \tilde{u}_i^h)$ and bottom-right corner $\tilde{u}_i^L = 0(\tilde{u}_i^x + \tilde{u}_i^w, \tilde{u}_i^y + \tilde{u}_i^h)$ of the extended upper-body bounding box $\tilde{u}_i$, and $\text{proj}_G(s)$ represents the projection of the point s onto the ground plane G. Further, a subset of points associated with an object closest to the image input device 142 (FIG. 1) may be selected by the second verification module 124 (FIG. 1) because an occluding object may be a closer or the closest object to the image input device 132 (FIG. 1). That is, the second verification module 124 may partition the selected subset $S_{u_i}$ into a set of disjoint subsets such that $S_{u_i} = \theta_{i=n}^{N} S_{u_i^n}$, where the points may be grouped together in a disjoint subset when the distance between neighboring points is smaller than a threshold τ (e.g., 1 meter). In an aspect, the second verification module 124 measures the distance of the occluding object (also interchangeably referred to herein as the "occluder object") from the image input device 132 (FIG. 1) based on the selected subset $S_{u_i}$ of depth measurements. That is, the second verification module 124 may measure the distance of the occluding object from the image input device 132 (FIG. 1) by calculating the value of:

$$\min_n \{|\text{avg}(S_{u_i}^n)| \| 1 \leq n \leq N\}, \quad (6)$$

where avg(.) represents the mean point in a point cloud and $\min_n \{\|\text{avg}(S_{u_i}^n)\| \| 1 \leq n \leq N\}$ represents the depth of the object closest to the image input device in the direction of extended upper-body bounding box $\tilde{u}_i$.

Referring again to the method of FIG. 4, at block 412, the method includes determining whether or not an occluding object is closer to an image input device than an extended body part bounding box. In an aspect, the second verification module 124 (e.g., in conjunction with processor 120 and/or memory 106 as shown in FIG. 1) may determine whether or not the occluding object is closer to the image input device 132 (FIG. 1) than the extended upper-body bounding box $\tilde{u}_i$. The second verification module 124 determines that the occluding object is closer to the image input device 132 (FIG. 1) than the extended upper-body bounding box $\tilde{u}_i$ when the following condition is satisfied:

$$\min_n \{\|\text{avg}(S_{u_i}^n)\| \| 1 \leq n \leq N\} < \|\phi(\tilde{u}_i)\| \quad (7)$$

where avg(.) represents the mean point in a point cloud. If, according to Equation (7), the second verification module 124 determines the occluding object is closer than the extended upper-body bounding box $\tilde{u}_i$ to the image input device 132 (FIG. 1), then the detection of the partially occluded object by the part-based body detector 110 (FIG. 1) is verified as accurate at block 414. Otherwise, the detection of the partially occluded object by the part-based body detector 110 (FIG. 1) is determined to be inaccurate at block 416.

It is to be appreciated that the methods for verifying the detection of partially occluded objects, as discussed above with regard to FIG. 3 and FIG. 4, may be implemented together, or the methods may be implemented separately. For example, when the methods of FIG. 3 and FIG. 4 are implemented together, the detection of a partially occluded object may be verified when at least one of the first verification module 122 or the second verification module 124 (e.g., in conjunction with processor 120 and/or memory 106 as shown in FIG. 1) verify the detection of the partially occluded object is accurate.

According to various aspects of the present disclosure, the detection and verification of partially occluded objects (e.g., partially occluded pedestrians) in a driving scene may be transmitted to and used by vehicle systems 130 (e.g., ADAS) to adjust various vehicle systems and/or take other actions accordingly.

The aspects of the disclosure discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for verifying detection of a first object partially occluded by a second object relative to a vehicle, the method comprising:
   receiving image information via an image input device;
   determining a first detection window bounding a first image in the image information corresponding to the first object;
   determining a second detection window bounding a second image in the image information corresponding to the second object;
   determining whether the first window and the second window overlap;
   determining a first distance to the first detection window and a second distance to the second detection window;
   comparing the first distance to the second distance, and if the first distance is greater than the second distance, verifying that the first object is partially occluded by the second object.

2. The method of claim 1, wherein verifying that the first object is partially occluded by the second object further includes:
   receiving an input from a depth sensor, the depth sensor input corresponding to a measured distance between the depth sensor and the second object;
   comparing the first distance to the measured distance; and
   verifying that the first distance is greater than the measured distance.

3. The method of claim 1, wherein the first object is a human.

4. The method of claim 1, wherein the first object is selected from a group consisting of a human, a bicycle, a motorcycle, and an animal.

5. The method of claim 1, wherein the image input device is a camera.

6. The method of claim 5, wherein the camera is mounted on the vehicle.

7. The method of claim 1, wherein determining whether the first window and the second window overlap includes:
   determining whether the first image is a partial image.

8. The method of claim 7, wherein the first image is a human, and wherein determining whether the first image is a partial image includes:
   applying human recognition to at least a portion of the first image.

9. The method of claim 2, wherein the depth sensor is selected from a group consisting of a LIDAR device, a RADAR device, and a stereo camera system.

10. A method for verifying detection of a first object partially occluded by a second object relative to a vehicle, the method comprising:

receiving image information via an image input device;

determining a first detection window bounding a first image in the image information corresponding to the first object;

determining a second detection window bounding a second image in the image information corresponding to the second object;

determining whether the first window and the second window overlap;

determining a first distance to the first detection window;

receiving an input from a depth sensor, the depth sensor input corresponding to a measured distance between the depth sensor and the second object;

comparing the first distance to the measured distance; and if the first distance is greater than the measured distance, verifying that the first object is partially occluded by the second object.

11. A system for verifying detection of a first object partially occluded by a second object relative to a vehicle, the system comprising:

an image input device for receiving image information;

an object detector to determine a first detection window bounding a first image in the image information corresponding to the first object, and a second detection window bounding a second image in the image information corresponding to the second object; and a processor operatively connected for computer communication to the image input device and the object detector, the processor being configured to:
determine whether the first detection window and the second detection window overlap;
if the first and second detection windows overlap, determine a first distance to the first object and determine a second distance to the second object; and
if the first distance is greater than the second distance, verify that the first object is partially occluded.

12. The system of claim 11, wherein the processor being configured to determine a first distance to the first object and determine a second distance to the second object includes:
determining a first distance to the first object using the received image information and location information for the first detection window.

13. The system of claim 12, wherein the processor being configured to determine a first distance to the first object and determine a second distance to the second object includes:
determining a second distance to the second object using the received image information and location information for the second detection window.

14. The system of claim 12, further comprising:

a depth sensor;

wherein the processor being configured to determine a first distance to the first object and determine a second distance to the second object includes:

receiving a depth sensor input corresponding to the distance between the depth sensor and the second object as the second distance.

15. The system of claim 11, wherein the first object is a human.

16. The system of claim 11, wherein the image input device is a camera.

17. The system of claim 16, wherein the camera is mounted on the vehicle.

18. The system of claim 11, wherein determining whether the first window and the second window overlap includes:
determining whether the first image is a partial image.

19. The system of claim 18, wherein the first image is a human, and wherein determining whether the first image is a partial image includes:
applying human recognition to at least a portion of the first image.

20. The system of claim 14, wherein the depth sensor is selected from a group consisting of a LIDAR device, a RADAR device, and a stereo camera system.

* * * * *